(12) United States Patent
Esaki et al.

(10) Patent No.: US 8,556,590 B2
(45) Date of Patent: Oct. 15, 2013

(54) WIND-TURBINE ROTOR BLADE

(75) Inventors: Kouji Esaki, Tokyo (JP); Takao Kuroiwa, Tokyo (JP); Nozomu Kawasetsu, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/389,534

(22) PCT Filed: Dec. 25, 2009

(86) PCT No.: PCT/JP2009/071574
§ 371 (c)(1),
(2), (4) Date: Feb. 8, 2012

(87) PCT Pub. No.: WO2011/077545
PCT Pub. Date: Jun. 30, 2011

(65) Prior Publication Data
US 2012/0141282 A1  Jun. 7, 2012

(51) Int. Cl.
*F03D 3/06*  (2006.01)
(52) U.S. Cl.
USPC .......................................... 416/226; 416/233
(58) Field of Classification Search
USPC ................. 416/226, 229 R, 230, 233, 500
See application file for complete search history.

(56) References Cited

U.S. PATENT DOCUMENTS

| | | | |
|---|---|---|---|
| 4,643,646 A | 2/1987 | Hahn et al. | |
| 4,732,542 A | 3/1988 | Hahn et al. | |
| 4,976,587 A * | 12/1990 | Johnston et al. | 416/230 |
| 7,438,533 B2 * | 10/2008 | Eyb et al. | 416/230 |
| 8,043,065 B2 * | 10/2011 | Kyriakides | 416/224 |
| 8,043,067 B2 * | 10/2011 | Kuroiwa et al. | 416/230 |
| 8,172,542 B2 * | 5/2012 | Hirano et al. | 416/230 |
| 2007/0025859 A1 * | 2/2007 | Jacobsen | 416/230 |
| 2007/0140863 A1 * | 6/2007 | Eyb et al. | 416/241 R |
| 2009/0169392 A1 * | 7/2009 | Kuroiwa et al. | 416/241 A |
| 2010/0135818 A1 * | 6/2010 | Babu et al. | 416/226 |
| 2011/0171035 A1 * | 7/2011 | Esaki et al. | 416/226 |
| 2011/0171036 A1 * | 7/2011 | Esaki et al. | 416/227 A |
| 2011/0182742 A1 * | 7/2011 | Hirano et al. | 416/229 R |
| 2012/0141282 A1 * | 6/2012 | Esaki et al. | 416/224 |

FOREIGN PATENT DOCUMENTS

| | | | |
|---|---|---|---|
| JP | 2002-137307 | | 5/2002 |
| JP | 2002-357176 | | 12/2002 |
| JP | 2002357176 A | * | 12/2002 |
| JP | 2007255366 A | * | 10/2007 |
| JP | 2011032987 A | * | 2/2011 |
| JP | 2011032988 A | * | 2/2011 |
| WO | WO 2008/086805 | | 7/2008 |
| WO | WO 2009155920 A1 | * | 12/2009 |

* cited by examiner

*Primary Examiner* — Edward Look
*Assistant Examiner* — Christopher R Legendre
(74) *Attorney, Agent, or Firm* — Manabu Kanesaka; Kenneth M. Berner; Benjamin J. Hauptman (57) ABSTRACT

A wind-turbine rotor blade has an outer skin member formed of fiber-reinforced plastic, shear webs, and trailing-edge sandwich members disposed closer to a trailing edge than the shear webs are. The outer skin member at the dorsal side located closer to the trailing edge than a trailing-edge end of the trailing-edge sandwich member located at the dorsal side or a vicinity of the trailing-edge end of the trailing-edge sandwich member located at the dorsal side is coupled, via a reinforcing member, with the outer skin member at the ventral side located closer to the trailing edge than the trailing-edge end of the trailing-edge sandwich member located at the ventral side or a vicinity of the trailing-edge end of the trailing-edge sandwich member located at the ventral side.

8 Claims, 7 Drawing Sheets

WIND-TURBINE ROTOR BLADE

RELATED APPLICATIONS

The present application is National Phase of International Application No. PCT/JP2009/071574 filed Dec. 25, 2009.

TECHNICAL FIELD

The present invention relates to a wind-turbine rotor blade that constitutes a wind turbine for wind power generation.

BACKGROUND ART

A known wind-turbine rotor blade is disclosed in Patent Citation 1, for example.
Patent Citation 1:
PCT International Publication No. WO 2008/086805 Pamphlet

DISCLOSURE OF INVENTION

Figure 10:
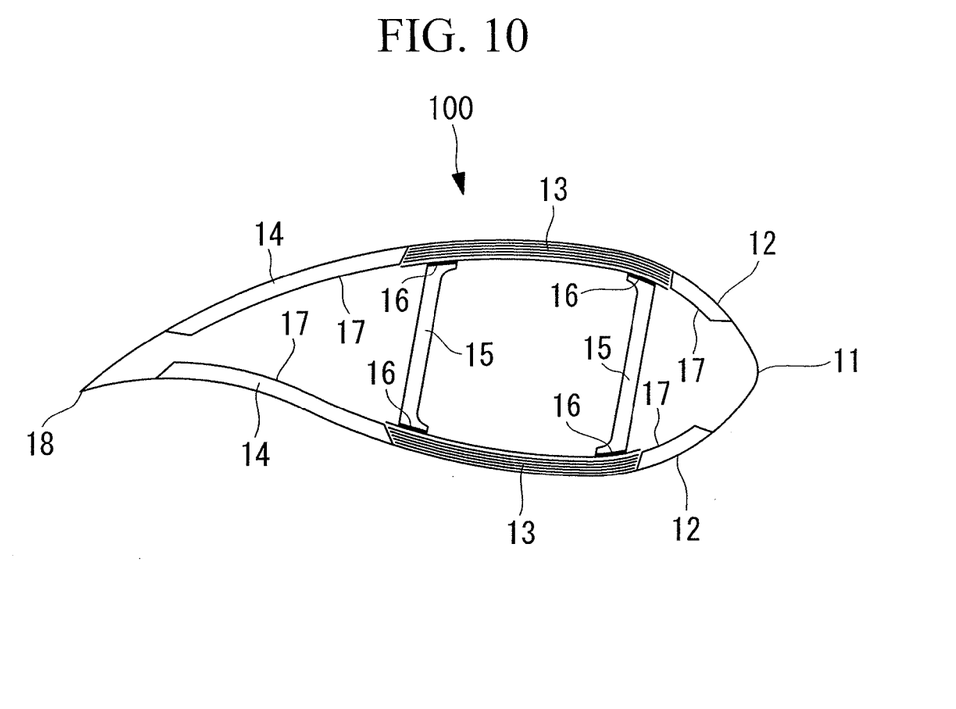
FIG. 10 is a cross-sectional view showing a conventional wind-turbine rotor blade, which is similar to FIG. 2.

Furthermore, in recent years, a wind-turbine rotor blade 100 having a spar cap structure that satisfies both lightweight and strength requirements has been proposed, as shown in FIG. 10. The wind-turbine rotor blade 100 is provided with an outer skin member 11, leading-edge sandwich members 12, spar cap members (main strengthening members) 13, trailing-edge sandwich members 14, and shear webs 15, all of which will be described later.

The leading-edge sandwich members 12 and the trailing-edge sandwich members 14 have a sandwich structure in which the outer skin member 11 and inner skin members 17 are used as skin members, and plastic foam, such as PVC foam, or wood, such as balsa, is used as a core material.

Note that reference numeral 16 in FIG. 10 indicates an adhesive for connecting (coupling) the spar cap members 13 and the shear webs 15.

The wind-turbine rotor blade can be reduced in weight when the safety factor for the buckling strength and the safety factor for the material strength (strength in tension and compression) of each of the members (more specifically, the outer skin member 11, the leading-edge sandwich members 12, the spar cap members 13, the trailing-edge sandwich members 14, and the shear webs 15) constituting the wind-turbine rotor blade 100 can be set at the same level (for example, 2).

However, in the wind-turbine rotor blade 100 shown in FIG. 10, before 100% material strength is exerted, buckling may occur at the spar cap members 13 with respect to the load in a flap direction (dorsal-ventral direction: the vertical direction in FIG. 10), and buckling may occur at the trailing-edge sandwich members 14 and/or the outer skin member 11 at the dorsal side and/or at the ventral side located closer to the trailing edge 18 than the trailing-edge end of the corresponding trailing-edge sandwich member 14 is, with respect to the load in an edge direction (leading-edge-to-trailing-edge direction: the direction perpendicular to the flap direction).

To increase the buckling strength of the spar cap members 13 with respect to the load in the flap direction, it is just necessary to narrow the widths (the lengths in the chord direction (in the horizontal direction in FIG. 10)) of the spar cap members 13 and to increase the thicknesses of the spar cap members 13 while maintaining the cross-sectional areas of the spar cap members 13 at the same level, and also to narrow the space between the shear webs 15 (the distance between the shear web 15 located closer to the leading edge and the shear web 15 located closer to the trailing edge).

On the other hand, however, there is a problem in that the widths (the lengths in the chord direction (in the horizontal direction in FIG. 10)) of the trailing-edge sandwich members 14 are increased, and the buckling strength of the trailing-edge sandwich members 14 with respect to the load in the edge direction is reduced even more.

The present invention has been made in view of the above-described circumstances, and an object thereof is to provide a wind-turbine rotor blade capable of improving the buckling strength with respect to the load in the edge direction, of bringing the safety factor for the buckling strength closer to the safety factor for the material strength, and of achieving a further reduction in weight.

In order to solve the above-described problems, the present invention employs the following solutions.

The present invention provides a wind-turbine rotor blade having an outer skin member formed of fiber-reinforced plastic, shear webs, and trailing-edge sandwich members disposed closer to a trailing edge than the shear webs are, in which the outer skin member at a dorsal side located closer to the trailing edge than a trailing-edge end of the trailing-edge sandwich member located at the dorsal side or a vicinity of the trailing-edge end of the trailing-edge sandwich member located at the dorsal side is coupled, via a reinforcing member, with the outer skin member at a ventral side located closer to the trailing edge than a trailing-edge end of the trailing-edge sandwich member located at the ventral side or a vicinity of the trailing-edge end of the trailing-edge sandwich member located at the ventral side.

According to the wind-turbine rotor blade of the present invention, the outer skin member at the dorsal side located closer to the trailing edge than the trailing-edge end of the trailing-edge sandwich member located at the dorsal side or the vicinity of the trailing-edge end of the trailing-edge sandwich member located at the dorsal side is coupled, via the reinforcing member, with the outer skin member at the ventral side located closer to the trailing edge than the trailing-edge end of the trailing-edge sandwich member located at the ventral side or the vicinity of the trailing-edge end of the trailing-edge sandwich member located at the ventral side. Therefore, it is possible to improve the flexural rigidity in the edge direction at the trailing-edge portion, to improve the buckling strength with respect to the load in the edge direction at the trailing-edge portion, to bring the safety factor for the buckling strength closer to the safety factor for the material strength, and to achieve a further reduction in weight.

In the above-described wind-turbine rotor blade, it is more preferable that the reinforcing member be provided with a lightweight core material, a dorsal-side skin member disposed at the dorsal side of the lightweight core material, and a ventral-side skin member disposed at the ventral side of the lightweight core material; the lightweight core material, the dorsal-side skin member, and the ventral-side skin member be integrally formed; and the dorsal-side skin member and/or the ventral-side skin member be formed of fiber-reinforced plastic in which reinforcement fibers are oriented in a blade longitudinal direction.

According to this wind-turbine rotor blade, the reinforcement fibers used for the dorsal-side skin member and/or the ventral-side skin member are oriented along the blade longitudinal direction. Therefore, it is possible to further improve the flexural rigidity in the edge direction at the trailing-edge portion, to further improve the buckling strength with respect to the load in the edge direction at the trailing-edge portion, to further bring the safety factor for the buckling strength closer to the safety factor for the material strength, and to achieve a further reduction in weight.

In the above-described wind-turbine rotor blade, it is more preferable that a second skin member that is disposed on an outer side of the lightweight core material, the dorsal-side skin member, and the ventral-side skin member be further provided; and the lightweight core material, the dorsal-side skin member, the ventral-side skin member, and the second skin member be integrally formed.

According to this wind-turbine rotor blade, the relative displacement in the blade longitudinal direction between the outer skin member at the dorsal side and the outer skin member at the ventral side is suppressed. Therefore, it is possible to prevent a shear fracture of the lightweight core material, which may be caused by the relative displacement in the blade longitudinal direction between the outer skin member at the dorsal side and the outer skin member at the ventral side.

The present invention provides a wind turbine for wind power generation including the wind-turbine rotor blade capable of improving the flexural rigidity in the edge direction at the trailing-edge portion, of improving the buckling strength with respect to the load in the edge direction at the trailing-edge portion, of bringing the safety factor for the buckling strength closer to the safety factor for the material strength, and of achieving a further reduction in weight.

According to the wind turbine for wind power generation of the present invention, it is possible to achieve a reduction in the weight of rotational bearings that couple a rotor head and the root portions of the wind-turbine rotor blades and a reduction in the weight of a connecting shaft that is installed in the rotor head to impart rotational movement to the wind turbine blades, and to reduce the load imposed on a tower that supports the wind-turbine rotor blades and the rotor head.

According to the present invention, an advantage is afforded in that it is possible to improve the buckling strength with respect to the load in the edge direction, to bring the safety factor for the buckling strength closer to the safety factor for the material strength, and to achieve a further reduction in weight.

EXPLANATION OF REFERENCE

1: wind turbine for wind power generation
2: column (tower)
3: nacelle
4: rotor head
5: wind-turbine rotor blade
6: nacelle cover
11: outer skin member
12: leading-edge sandwich members
13: spar cap members (main strengthening members)
14: trailing-edge sandwich members
15: shear webs
16: adhesive
17: inner skin members
18: trailing edge
19: reinforcing member
20: lightweight core material
21: skin member (dorsal-side skin member)
22: skin member (ventral-side skin member)
23: adhesive
30: wind-turbine rotor blade
31: reinforcing member
32: trailing-edge strut member
40: wind-turbine rotor blade
41: reinforcing member
42: angular-U-shaped strut member
50: wind-turbine rotor blade
51: reinforcing member
52: trapezoidal-shaped strut member
60: wind-turbine rotor blade
61: reinforcing member
62: (second) skin member
70: wind-turbine rotor blade
71: reinforcing member
72: (second) skin members
90: wind-turbine rotor blade
91: shear web (strut member)
92: adhesive
B: foundation

BEST MODE FOR CARRYING OUT THE INVENTION

A wind-turbine rotor blade according to a first embodiment of the present invention will be described below with reference to FIGS. 1 to 3.

Figure 1:
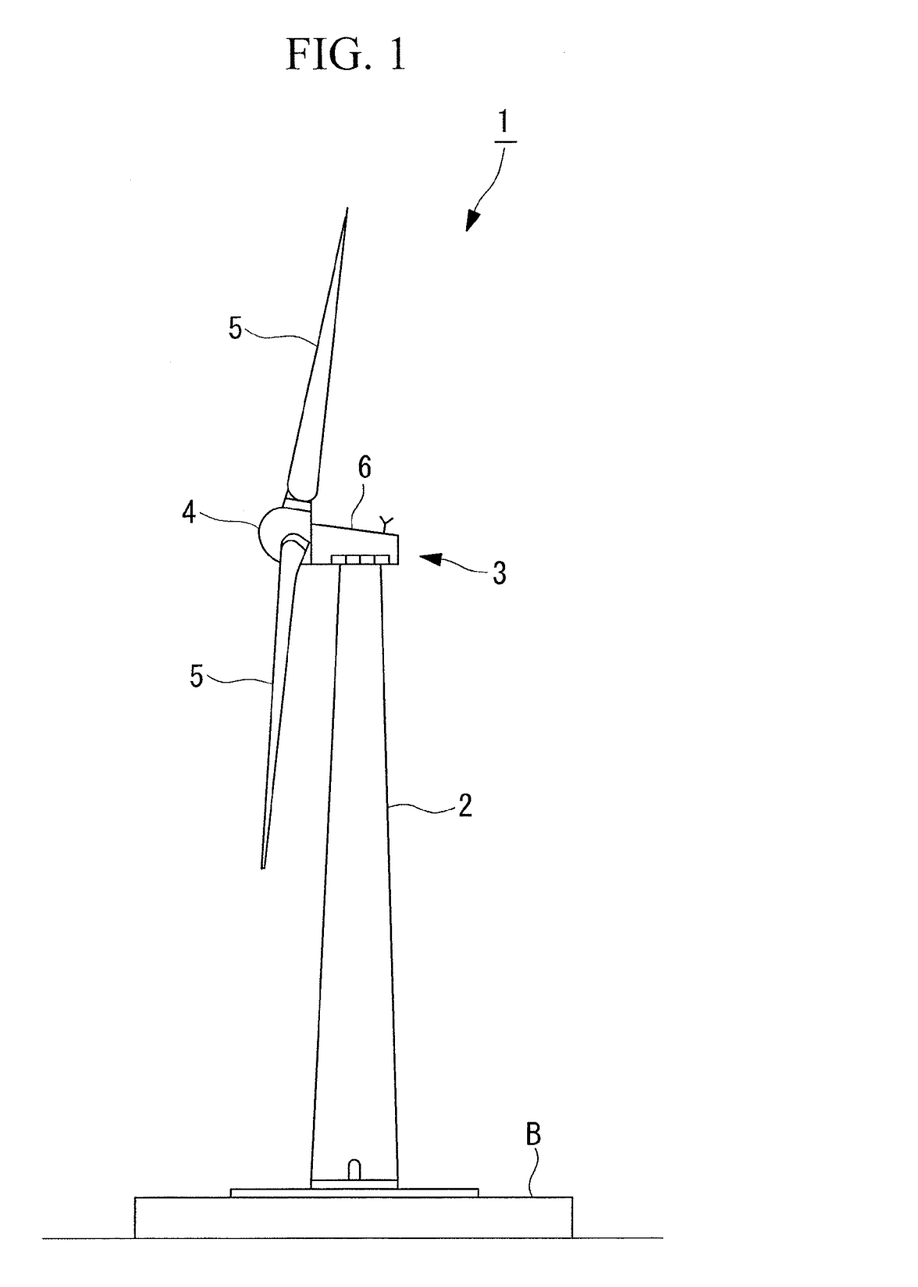
FIG. 1 is a side view showing a wind turbine for wind power generation, having a wind-turbine rotor blade according to a first embodiment of the present invention.

FIG. 1 is a side view showing a wind turbine for wind power generation, having the wind-turbine rotor blade according to this embodiment. FIG. 2 is a cross-sectional view of the wind-turbine rotor blade according to this embodiment. FIG. 3 is an enlarged cross-sectional view of a main portion shown in FIG. 2.

As shown in FIG. 1, a wind turbine 1 for wind power generation has a column (also referred to as "tower") 2 provided upright on a foundation B, a nacelle 3 provided on the top of the column 2, and a rotor head 4 provided on the nacelle 3 so as to be capable of rotating about a substantially horizontal axis.

A plurality of (for example, three) wind-turbine rotor blades 5 are attached to the rotor head 4 radially from the rotational axis of the rotor head 4. With this structure, the force of wind striking the wind-turbine rotor blades 5 from the direction of the rotational axis of the rotor head 4 is converted to mechanical power for rotating the rotor head 4 about the rotational axis.

The column 2 has a structure in which a plurality of (for example, three) units (not shown) are vertically coupled.

Furthermore, the nacelle 3 is installed on the unit that is provided at the uppermost position, among the units constituting the column 2, and has a nacelle base plate (not shown) attached to the top end of the column 2 and a cover 6 that covers the nacelle base plate from above.

Figure 2:
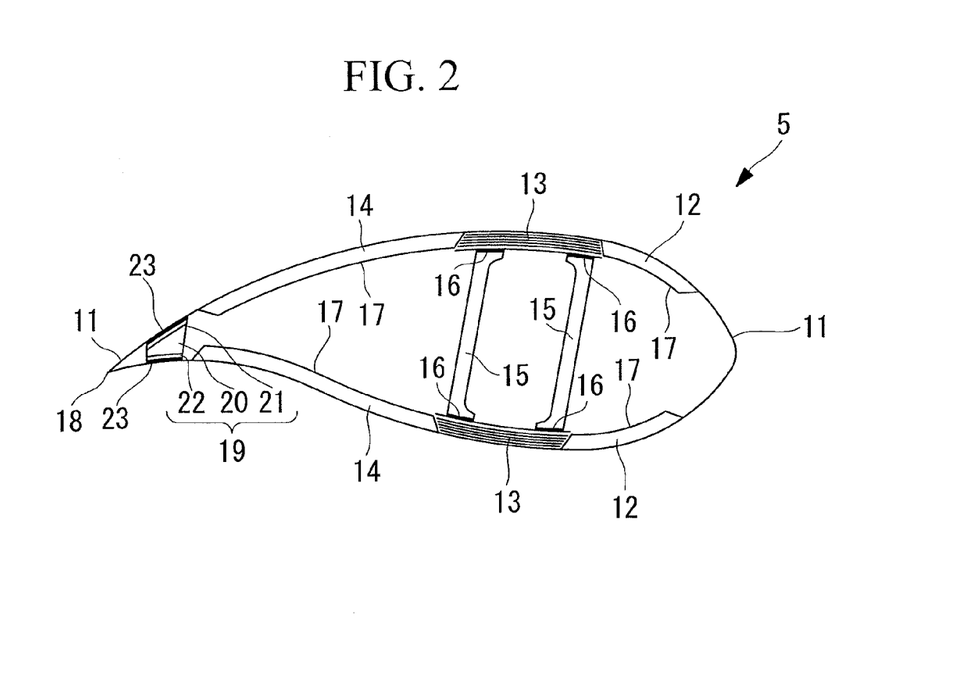
FIG. 2 is a cross-sectional view of the wind-turbine rotor blade according to the first embodiment of the present invention.

As shown in FIG. 2, each of the wind-turbine rotor blades 5 has a spar cap structure satisfying both lightweight and strength requirements and is provided with an outer skin member 11, leading-edge sandwich members 12, spar cap members (main strengthening members) 13, trailing-edge sandwich members 14, and shear webs (strut members) 15.

The leading-edge sandwich members 12 and the trailing-edge sandwich members 14 have a sandwich structure in which the outer skin member 11 and inner skin members 17 are used as skin members, and plastic foam, such as PVC foam, or wood, such as balsa, is used as a core material.

The outer skin member 11, the spar cap members 13, and the inner skin members 17 are each formed (made) of fiber-reinforced plastic (FRP). The spar cap members 13 are formed by laminating fiber-reinforced plastic in layers. One of the spar cap members 13 is provided on a dorsal side (upper side in FIG. 2) of the wind-turbine rotor blade 5, and the other is provided on a ventral side (lower side in FIG. 2) thereof, so as to be brought into contact with dorsal-side end faces of the shear webs 15 and with ventral-side end faces thereof, respectively. Furthermore, the spar cap members 13 and the shear webs 15 are connected (coupled) with an adhesive 16 that hardens at room temperature.

In this spar cap structure, the flap-direction flexural strength of the wind-turbine rotor blade 5 is maintained mainly by the spar cap members 13, formed of fiber-reinforced plastic, and the buckling strength of the wind-turbine rotor blade 5 is maintained by making subsidiary use of the leading-edge sandwich members 12 and the trailing-edge sandwich members 14.

In the wind-turbine rotor blade 5 according to this embodiment, a reinforcing member 19 is provided (disposed) between the outer skin member 11 at the dorsal side located closer to a trailing edge 18 than a trailing-edge end of the trailing-edge sandwich member 14 located at the dorsal side or the vicinity of the trailing-edge end of the trailing-edge sandwich member located at the dorsal side and the outer skin member 11 at the ventral side or the vicinity of the trailing-edge end of the trailing-edge sandwich member located at the ventral side.

Figure 3:
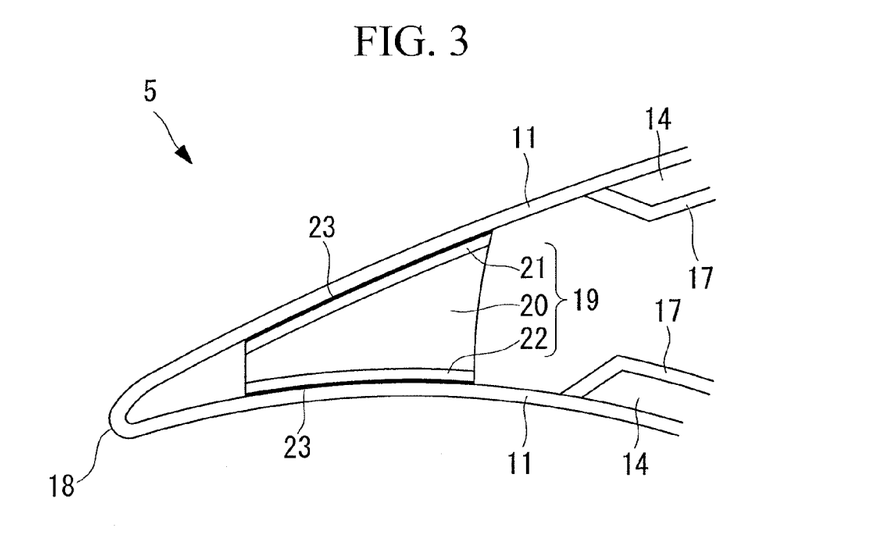
FIG. 3 is an enlarged cross-sectional view of a main portion shown in FIG. 2.

As shown in FIG. 2 or 3, the reinforcing member 19 has a lightweight core material 20, a (dorsal-side) skin member 21 disposed at the dorsal side of the lightweight core material 20, and a (ventral-side) skin member 22 disposed at the ventral side of the lightweight core material 20.

The lightweight core material 20 is formed (made) of plastic foam, such as PVC foam, or wood, such as balsa, and is sandwiched between the skin member 21 and the skin member 22.

The skin member 21 has the same length as the length in a chord direction (in the horizontal direction in FIGS. 2 and 3) of the corresponding (facing) end face of the lightweight core material 20, and the skin member 22 has the same length as the length in the chord direction of the corresponding (facing) end face of the lightweight core material 20. Furthermore, the skin members 21 and 22 are formed (made) of fiber-reinforced plastic in which reinforcement fibers (not shown) are orientated in a blade longitudinal direction (the direction perpendicular to the plane of the drawings in FIGS. 2 and 3) of the wind-turbine rotor blade 5.

The skin member 21 is brought into contact with a dorsal-side end face of the lightweight core material 20, and the skin member 22 is brought into contact with a ventral-side end face of the lightweight core material 20. The lightweight core material 20 and the skin members 21 and 22 are integrally formed (made). Furthermore, the outer skin member 11 and the skin member 21 are connected (coupled) with an adhesive 23 that hardens at room temperature, and the outer skin member 11 and the skin member 22 are connected (coupled) with the adhesive 23.

According to the wind-turbine rotor blade 5 of this embodiment, the outer skin member 11 at the dorsal side located closer to the trailing edge 18 than the trailing-edge end of the trailing-edge sandwich member 14 located at the dorsal side or the vicinity of the trailing-edge end of the trailing-edge sandwich member located at the dorsal side is coupled, via the reinforcing member 19, with the outer skin member 11 at the ventral side located closer to the trailing edge 18 than the trailing-edge end of the trailing-edge sandwich member 14 located at the ventral side or the vicinity of the trailing-edge end of the trailing-edge sandwich member located at the ventral side. Therefore, it is possible to improve the flexural rigidity in an edge direction at a trailing-edge portion, to improve the buckling strength with respect to the load in the edge direction at the trailing-edge portion, to bring the safety factor for the buckling strength closer to the safety factor for the material strength, and to achieve a further reduction in weight.

As a result, even when the widths (the lengths in the chord direction (the horizontal direction in FIG. 2)) of the trailing-edge sandwich members 14 are increased, it is possible to prevent a reduction in the buckling strength of the trailing-edge sandwich members 14 with respect to the load in the edge direction. Therefore, it is possible to narrow the space in the chord direction between the shear webs 15, that is, the distance between the shear web 15 located closer to the leading edge and the shear web 15 located closer to the trailing edge, to narrow the widths of the spar cap members 13 (at this time, the thicknesses of the spar cap members 13 are increased while maintaining the cross-sectional areas of the spar cap members 13 at the same level), and to improve the buckling strength of the spar cap members 13 with respect to the load in the flap direction.

Furthermore, according to the wind-turbine rotor blade 5 of this embodiment, since the reinforcement fibers used for the skin members 21 and 22 are orientated along the blade longitudinal direction, it is possible to further improve the flexural rigidity in the edge direction at the trailing-edge portion, to further improve the buckling strength with respect to the load in the edge direction at the trailing-edge portion, to bring the safety factor for the buckling strength further closer to the safety factor for the material strength, and to achieve a further reduction in weight.

Furthermore, according to the wind turbine 1 for wind power generation, which has the wind-turbine rotor blade 5 of this embodiment, it is possible to achieve a reduction in the weight of rotational bearings (not shown) that couple the rotor head 4 and the root portions of the wind-turbine rotor blades and a reduction in the weight of a connecting shaft (not shown) that is installed in the rotor head 4 to impart rotational movement to the wind turbine blades, and to reduce the load imposed on the tower 2, which supports the wind-turbine rotor blades 5 and the rotor head 4.

A wind-turbine rotor blade according to a second embodiment of the present invention will be described with reference to FIG. 4.

Figure 4:
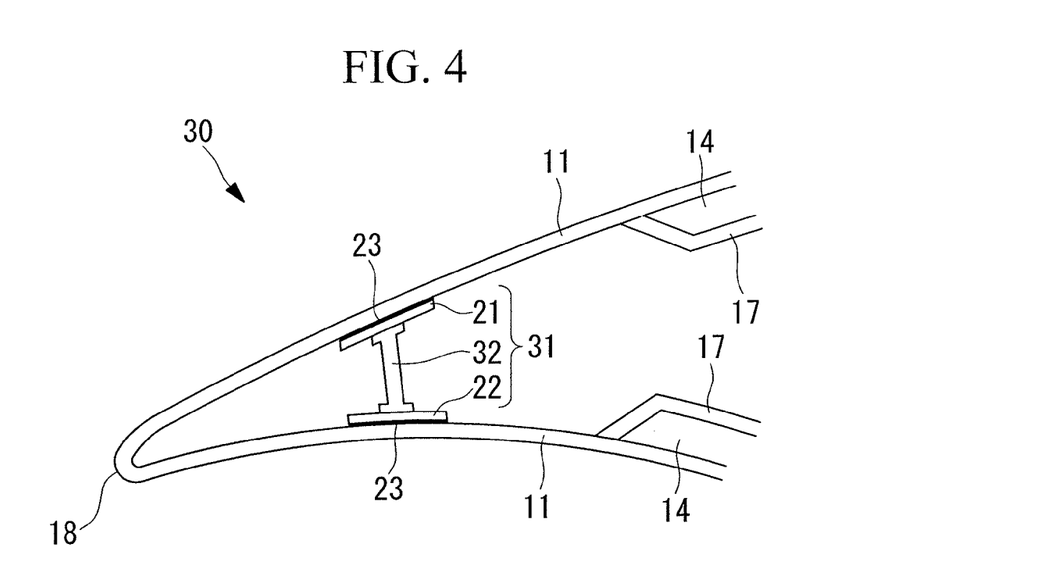
FIG. 4 is an enlarged cross-sectional view of a main portion of a wind-turbine rotor blade according to a second embodiment of the present invention, which is similar to FIG. 3.

FIG. 4 is an enlarged cross-sectional view of a main portion of the wind-turbine rotor blade according to this embodiment, which is similar to FIG. 3.

A wind-turbine rotor blade 30 according to this embodiment differs from that of the above-described first embodiment in that a reinforcing member 31 is provided instead of the reinforcing member 19. Since the other components are the same as those of the above-described first embodiment, a description thereof will be omitted here.

Note that identical reference numerals are assigned to the same members as those of the above-described embodiment.

As shown in FIG. 4, the reinforcing member 31 according to this embodiment has a trailing-edge strut member 32, the (dorsal-side) skin member 21 disposed at the dorsal side of the trailing-edge strut member 32, and the (ventral-side) skin member 22 disposed at the ventral side of the trailing-edge strut member 32.

The trailing-edge strut member 32 has an I-shape in cross section, is formed only of fiber-reinforced plastic (FRP) or formed (made) of FRP together with plastic foam, such as PVC foam, or wood, such as balsa, and is sandwiched between the skin member 21 and the skin member 22.

The skin members 21 and 22 are formed (made) so as to be longer than the lengths in the chord direction (in the horizontal direction in FIG. 4) of the corresponding (facing) end faces of the trailing-edge strut member 32 (than the flange lengths in the I-shape in cross section).

The skin member 21 is brought into contact with a dorsal-side end face of the trailing-edge strut member 32, and the skin member 22 is brought into contact with a ventral-side end face of the trailing-edge strut member 32. The trailing-edge strut member 32 and the skin members 21 and 22 are integrally formed (made).

The functional effects of the wind-turbine rotor blade 30 according to this embodiment are the same as those of the above-described first embodiment, and, therefore, a description thereof will be omitted here.

A wind-turbine rotor blade according to a third embodiment of the present invention will be described with reference to FIG. 5.

Figure 5:
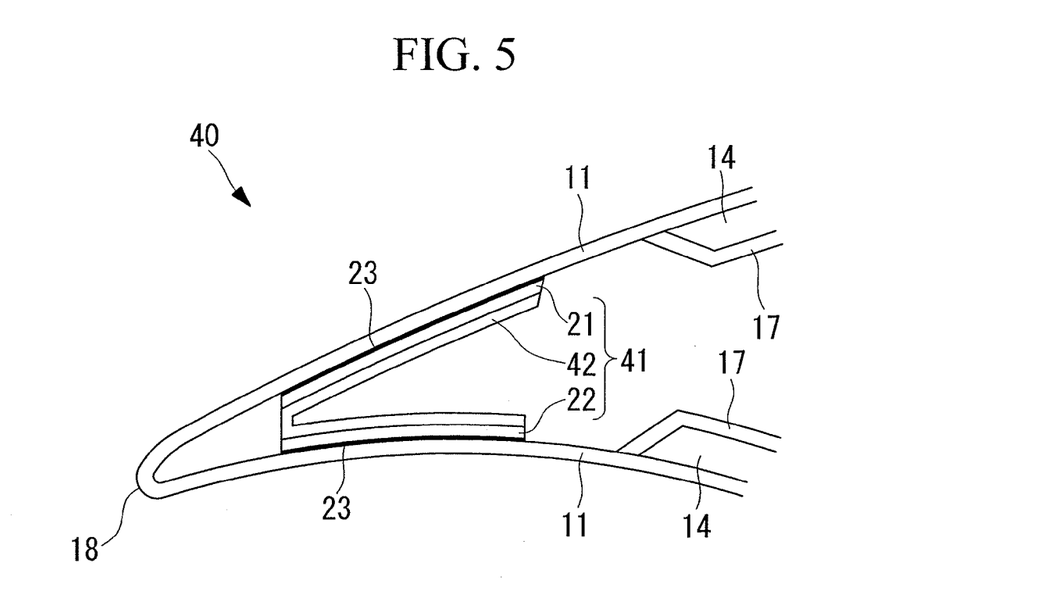
FIG. 5 is an enlarged cross-sectional view of a main portion of a wind-turbine rotor blade according to a third embodiment of the present invention, which is similar to FIG. 3.

FIG. 5 is an enlarged cross-sectional view of a main portion of the wind-turbine rotor blade according to this embodiment, which is similar to FIG. 3.

A wind-turbine rotor blade 40 according to this embodiment differs from that of the above-described first embodiment in that a reinforcing member 41 is provided instead of the reinforcing member 19. Since the other components are the same as those of the above-described first embodiment, a description thereof will be omitted here.

Note that identical reference numerals are assigned to the same members as those of the above-described embodiments.

As shown in FIG. 5, the reinforcing member 41 according to this embodiment has an angular-U-shaped strut member 42, the (dorsal-side) skin member 21 disposed at the dorsal side of the angular-U-shaped strut member 42, and the (ventral-side) skin member 22 disposed at the ventral side of the angular-U-shaped strut member 42.

The angular-U-shaped strut member 42 is formed only of fiber-reinforced plastic (FRP) or is formed (made) of FRP together with plastic foam, such as PVC foam, or wood, such as balsa. The angular-U-shaped strut member 42 has an angular-U-shape in cross section and is sandwiched between the skin member 21 and the skin member 22.

The skin member 21 has the same length as the length in the chord direction (the horizontal direction in FIG. 5) of the corresponding (facing) end face of the angular-U-shaped strut member 42, and the skin member 22 has the same length as the length in the chord direction (the horizontal direction in FIG. 5) of the corresponding (facing) end face of the angular-U-shaped strut member 42.

The skin member 21 is brought into contact with a dorsal-side end face of the angular-U-shaped strut member 42, and the skin member 22 is brought into contact with a ventral-side end face of the angular-U-shaped strut member 42. The angular-U-shaped strut member 42 and the skin members 21 and 22 are integrally formed (made).

The functional effects of the wind-turbine rotor blade 40 according to this embodiment are the same as those of the above-described first embodiment, and, therefore, a description thereof will be omitted here.

A wind-turbine rotor blade according to a fourth embodiment of the present invention will be described with reference to FIG. 6.

Figure 6:
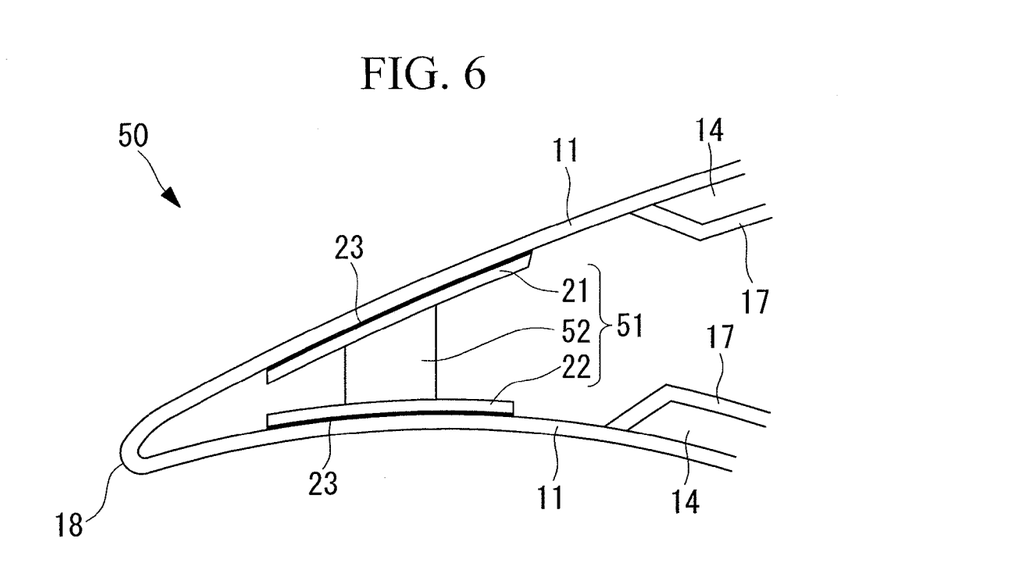
FIG. 6 is an enlarged cross-sectional view of a main portion of a wind-turbine rotor blade according to a fourth embodiment of the present invention, which is similar to FIG. 3.

FIG. 6 is an enlarged cross-sectional view of a main portion of the wind-turbine rotor blade according to this embodiment, which is similar to FIG. 3.

A wind-turbine rotor blade 50 according to this embodiment differs from that of the above-described first embodiment in that a reinforcing member 51 is provided instead of the reinforcing member 19. Since the other components are the same as those of the above-described first embodiment, a description thereof will be omitted here.

Note that identical reference numerals are assigned to the same members as those of the above-described embodiments.

As shown in FIG. 6, the reinforcing member 51 according to this embodiment has a trapezoidal-shaped strut member 52, the (dorsal-side) skin member 21 disposed at the dorsal side of the trapezoidal-shaped strut member 52, and the (ventral-side) skin member 22 disposed at the ventral side of the trapezoidal-shaped strut member 52.

The trapezoidal-shaped strut member 52 is formed only of fiber-reinforced plastic (FRP) or formed (made) of FRP together with plastic foam, such as PVC foam, or wood, such as balsa, and is sandwiched between the skin member 21 and the skin member 22.

The skin members 21 and 22 are formed (made) so as to be longer than the lengths in the chord direction (the horizontal direction in FIG. 6) of the corresponding (facing) end faces of the trapezoidal-shaped strut member 52.

The skin member 21 is brought into contact with a dorsal-side end face of the trapezoidal-shaped strut member 52, and the skin member 22 is brought into contact with a ventral-side end face of the trapezoidal-shaped strut member 52. The trapezoidal-shaped strut member 52 and the skin members 21 and 22 are integrally formed (made).

The functional effects of the wind-turbine rotor blade 50 according to this embodiment are the same as those of the above-described first embodiment, and, therefore, a description thereof will be omitted here.

A wind-turbine rotor blade according to a fifth embodiment of the present invention will be described with reference to FIG. 7.

Figure 7:
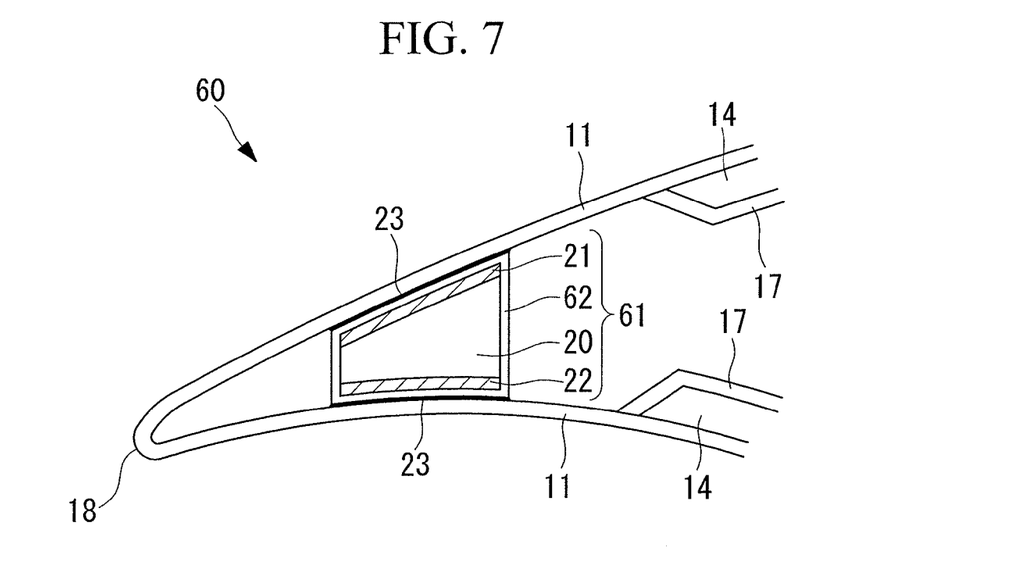
FIG. 7 is an enlarged cross-sectional view of a main portion of a wind-turbine rotor blade according to a fifth embodiment of the present invention, which is similar to FIG. 3.

FIG. 7 is an enlarged cross-sectional view of a main portion of the wind-turbine rotor blade according to this embodiment, which is similar to FIG. 3.

A wind-turbine rotor blade 60 according to this embodiment differs from that of the above-described first embodiment in that a reinforcing member 61 is provided instead of the reinforcing member 19. Since the other components are the same as those of the above-described first embodiment, a description thereof will be omitted here.

Note that identical reference numerals are assigned to the same members as those of the above-described embodiments.

As shown in FIG. 7, the reinforcing member 61 according to this embodiment is obtained by covering the periphery (outer side) of the reinforcing member 19, described in the first embodiment, with a (second) skin member 62. Specifically, the reinforcing member 61 according to this embodiment has the lightweight core material 20, the (first) skin member 21 disposed at the dorsal side of the lightweight core material 20, the (first) skin member 22 disposed at the ventral side of the lightweight core material 20, and the skin member 62 disposed so as to surround the outer side of the lightweight core material 20 and the skin members 21 and 22.

The skin member 62 is made, for example, of double-biased fiber-reinforced plastic that is obtained by sequentially laminating a +45° fiber-reinforced-plastic layer (not shown), in which reinforcement fibers are oriented at an angle of +45° with respect to the blade longitudinal direction (the direction perpendicular to the plane of FIG. 7) of the wind-turbine rotor blade 60, and a −45° fiber-reinforced-plastic layer (not shown), in which reinforcement fibers are oriented at an angle of −45° with respect to the blade longitudinal direction of the wind-turbine rotor blade 60.

The skin member 62 is brought into contact with a dorsal-side end face of the skin member 21, a ventral-side end face of the skin member 22, a leading-edge-side end face of the lightweight core material 20, and a trailing-edge-side end face of the lightweight core material 20. The lightweight core material 20 and the skin members 21, 22, and 62 are integrally formed (made). Furthermore, the outer skin member 11 and the skin member 62 are connected (coupled) with the adhesive 23, which hardens at room temperature.

According to the wind-turbine rotor blade 60 of this embodiment, the relative displacement in the blade longitudinal direction between the outer skin member 11 at the dorsal side and the outer skin member 11 at the ventral side is suppressed. Therefore, it is possible to prevent a shear fracture of the lightweight core material 20, which may be caused by the relative displacement in the blade longitudinal direction between the outer skin member 11 at the dorsal side and the outer skin member 11 at the ventral side.

The other functional effects are the same as those of the above-described first embodiment, and, therefore, a description thereof will be omitted here.

A wind-turbine rotor blade according to a sixth embodiment of the present invention will be described with reference to FIG. 8.

Figure 8:
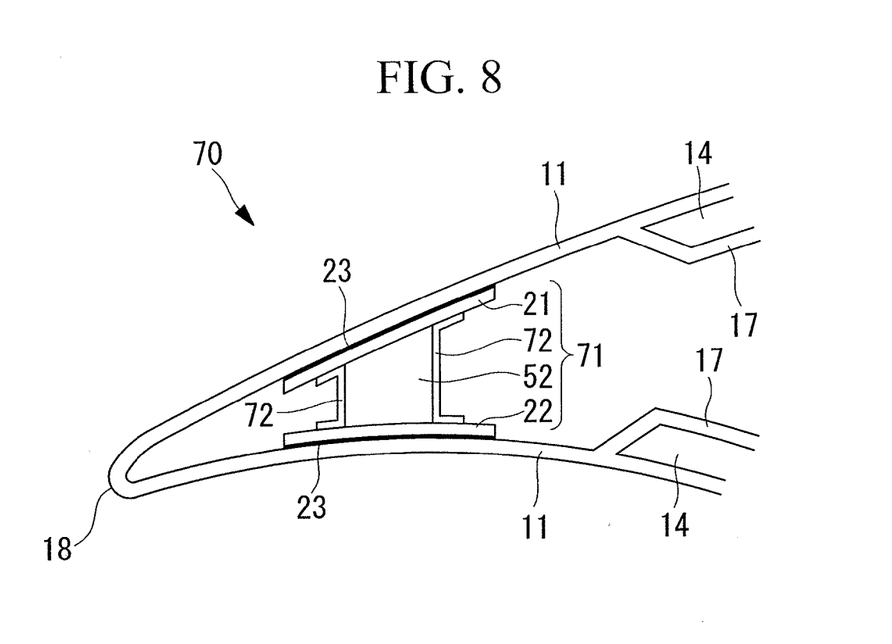
FIG. 8 is an enlarged cross-sectional view of a main portion of a wind-turbine rotor blade according to a sixth embodiment of the present invention, which is similar to FIG. 6.

FIG. 8 is an enlarged cross-sectional view of a main portion of the wind-turbine rotor blade according to this embodiment, which is similar to FIG. 6.

A wind-turbine rotor blade 70 according to this embodiment differs from that of the above-described fourth embodiment in that a reinforcing member 71 is provided instead of the reinforcing member 51. Since the other components are the same as those of the above-described fourth embodiment, a description thereof will be omitted here.

Note that identical reference numerals are assigned to the same members as those of the above-described embodiments.

As shown in FIG. 8, the reinforcing member 71 according to this embodiment is obtained by covering the periphery (outer side) of the reinforcing member 51, described in the fourth embodiment, with (second) skin members 72. Specifically, the reinforcing member 71 according to this embodiment has the trapezoidal-shaped strut member 52, the (first) skin member 21 disposed at the dorsal side of the trapezoidal-shaped strut member 52, the (first) skin member 22 disposed at the ventral side of the trapezoidal-shaped strut member 52, and the skin members 72 that each have a (substantially) angular-U-shape in cross section and that are disposed so as to surround the outer side of the trapezoidal-shaped strut member 52, having a trapezoidal-shape in cross section, and the skin members 21 and 22.

The skin members 72 are made, for example, of double-biased fiber-reinforced plastic that is obtained by sequentially laminating a +45° fiber-reinforced-plastic layer (not shown), in which reinforcement fibers are oriented at an angle of +45° with respect to the blade longitudinal direction (the direction perpendicular to the plane of FIG. 8) of the wind-turbine rotor blade 70, and a −45° fiber-reinforced-plastic layer (not shown), in which reinforcement fibers are oriented at an angle of −45° with respect to the blade longitudinal direction of the wind-turbine rotor blade 70.

The skin members 72 are each partially bonded to the ventral-side end face of the skin member 21 and the dorsal-side end face of the skin member 22, one of the skin members 72 is bonded to the entire leading-edge-side end face of the trapezoidal-shaped strut member 52, and the other is bonded to the entire trailing-edge-side end face of the trapezoidal-shaped strut member 52. The trapezoidal-shaped strut member 52 and the skin members 21, 22, and 72 are integrally formed (made). Furthermore, the outer skin member 11 and the skin member 21 are connected (coupled) with the adhesive 23, which hardens at room temperature, and the outer skin member 11 and the skin member 22 are connected (coupled) with the adhesive 23.

The functional effects of the wind-turbine rotor blade 70 according to this embodiment are the same as those of the above-described fifth embodiment, and, therefore, a description thereof will be omitted here.

Figure 9:
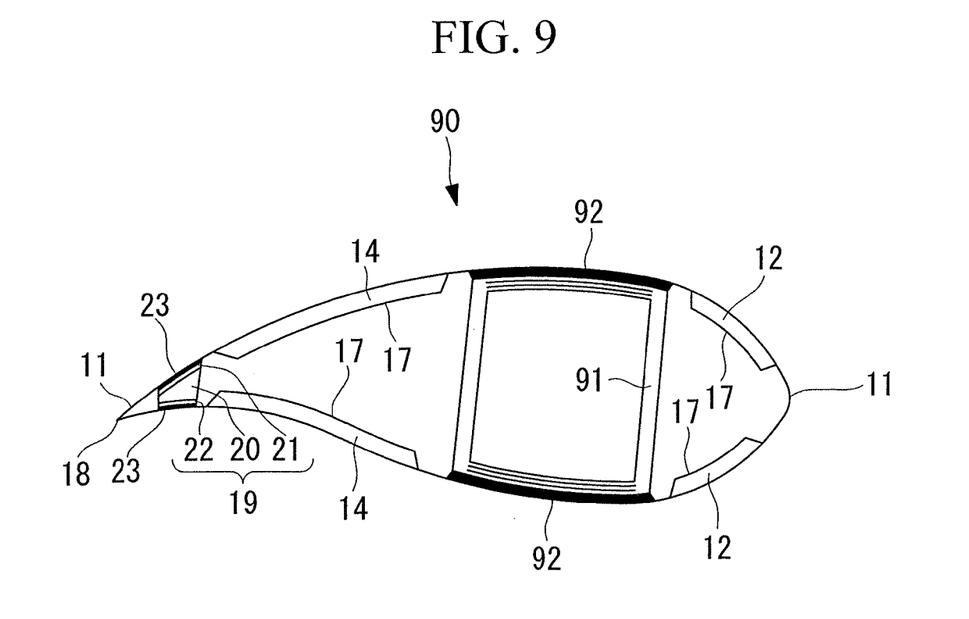
FIG. 9 is a cross-sectional view of a wind-turbine rotor blade according to another embodiment of the present invention, which is similar to FIG. 2.

Note that the reinforcing members 19, 31, 41, 51, 61, and 71 can be used not only for a wind-turbine rotor blade having a structure shown in FIG. 2 or FIG. 10, but also for, for example, a wind-turbine rotor blade 90 having a structure shown in FIG. 9, specifically, the wind-turbine rotor blade 90 having a box-type shear web 91. A dorsal-side end face of the shear web 91 and an inner face of the outer skin member 11 are connected (coupled) with an adhesive 92 that hardens at room temperature, and a ventral-side end face of the shear web 91 and an inner face of the outer skin member 11 are connected (coupled) with the adhesive 92.

Figure 11:
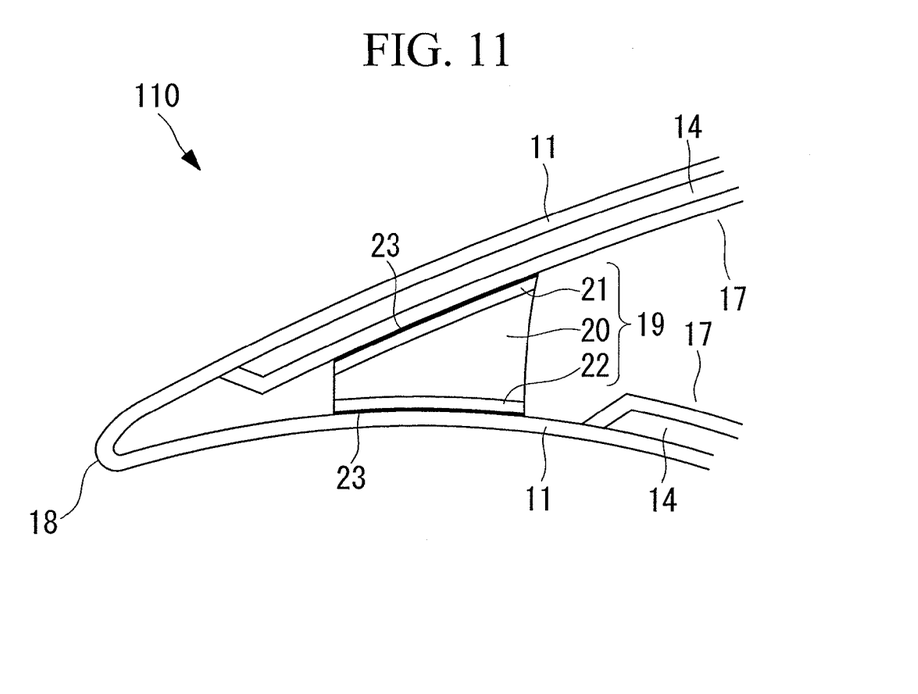
FIG. 11 is an enlarged cross-sectional view of a main portion of a wind-turbine rotor blade according to still another embodiment of the present invention, which is similar to FIG. 3.

Furthermore, the reinforcing members 19, 31, 41, 51, 61, and 71 can be used not only for a wind-turbine rotor blade having a structure shown in FIG. 2 or FIG. 10, but also for, for example, a wind-turbine rotor blade 110 having a structure shown in FIG. 11. Specifically, the wind-turbine rotor blade 110 has a structure in which the trailing-edge end of the trailing-edge sandwich member 14 disposed at the dorsal side extends closer to the trailing edge than the trailing-edge end of the trailing-edge sandwich member 14 disposed at the ventral side does or extends to the vicinity of the trailing edge 18. In this case, each of the reinforcing members 19, 31, 41, 51, 61, and 71 is provided between the inner skin member 17 located at a trailing-edge portion of the trailing-edge sandwich member 14 disposed at the dorsal side and the outer skin member 11 at the ventral side or the vicinity of the trailing-edge end of the trailing-edge sandwich member 14 disposed at the ventral side.

Figure 12:
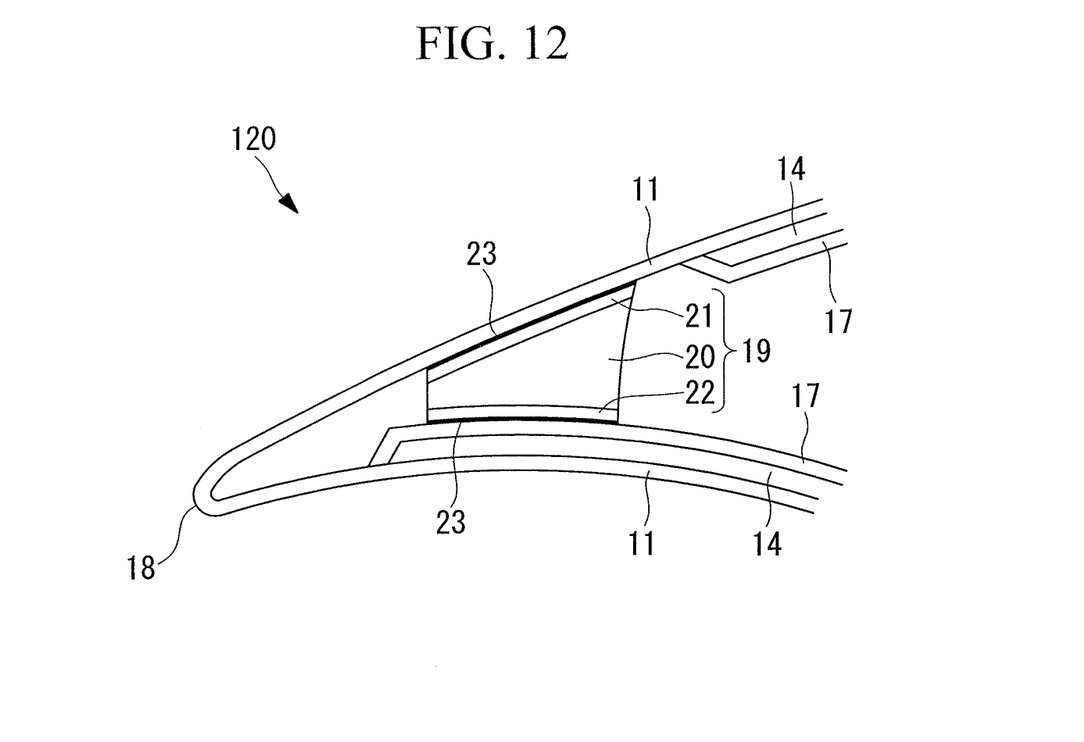
FIG. 12 is an enlarged cross-sectional view of a main portion of a wind-turbine rotor blade according to still another embodiment of the present invention, which is similar to FIG. 3.

Furthermore, the reinforcing members 19, 31, 41, 51, 61, and 71 can be used not only for a wind-turbine rotor blade having a structure shown in FIG. 2 or FIG. 10, but also for, for example, a wind-turbine rotor blade 120 having a structure shown in FIG. 12. Specifically, the wind-turbine rotor blade 120 has a structure in which the trailing-edge end of the trailing-edge sandwich member 14 disposed at the ventral side extends closer to the trailing edge than the trailing-edge end of the trailing-edge sandwich member 14 disposed at the dorsal side does or extends to the vicinity of the trailing edge 18. In this case, each of the reinforcing members 19, 31, 41, 51, 61, and 71 is provided between the inner skin member 17 located at a trailing-edge portion of the trailing-edge sandwich member 14 disposed at the ventral side and the outer skin member 11 at the dorsal side or the vicinity of the trailing-edge end of the trailing-edge sandwich member 14 disposed at the dorsal side.

Figure 13:
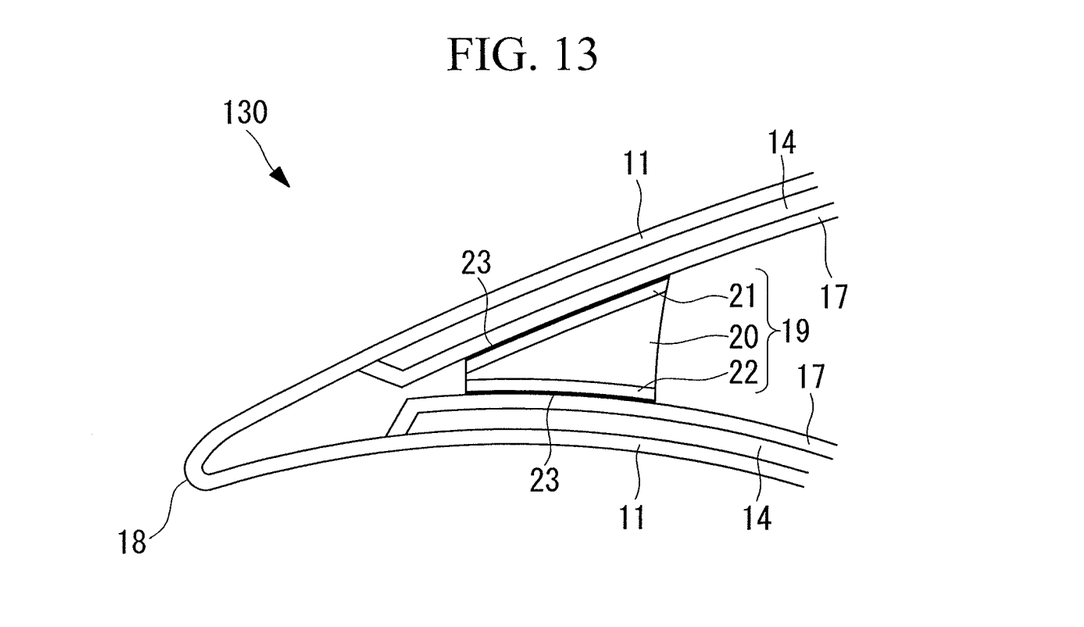
FIG. 13 is an enlarged cross-sectional view of a main portion of a wind-turbine rotor blade according to still another embodiment of the present invention, which is similar to FIG. 3.

Furthermore, the reinforcing members 19, 31, 41, 51, 61, and 71 can be used not only for a wind-turbine rotor blade having a structure shown in FIG. 2 or FIG. 10, but also for, for example, a wind-turbine rotor blade 130 having a structure shown in FIG. 13. Specifically, the wind-turbine rotor blade 130 has a structure in which the trailing-edge ends of the trailing-edge sandwich members 14 disposed at the ventral side and the dorsal side extend closer to the trailing edge than the trailing-edge ends of the trailing-edge sandwich members 14 described in the above-described first to sixth embodiments do or extend to the vicinity of the trailing edge 18. In this case, each of the reinforcing members 19, 31, 41, 51, 61, and 71 is provided between the inner skin member 17 located at the trailing-edge portion of the trailing-edge sandwich member 14 disposed at the dorsal side and the inner skin member 17 located at the trailing-edge portion of the trailing-edge sandwich member 14 disposed at the ventral side.

Note that, in FIGS. 9, 11, 12, and 13, the reinforcing member 19 described in the first embodiment is shown as a concrete example of the reinforcing member; however, this is not intended to exclude the other reinforcing members 31, 41, 51, 61, and 71.

The invention claimed is:

1. A wind-turbine rotor blade comprising: an outer skin member formed of fiber-reinforced plastic, shear webs, and trailing-edge sandwich members disposed closer to a trailing edge than the shear webs,
wherein the outer skin member at a dorsal side located closer to the trailing edge than a trailing-edge end of the trailing-edge sandwich member located at the dorsal side or a vicinity of the trailing-edge end of the trailing-edge sandwich member located at the dorsal side is coupled, via a reinforcing member, with the outer skin member at a ventral side located closer to the trailing edge than a trailing-edge end of the trailing-edge sandwich member located at the ventral side or a vicinity of the trailing-edge end of the trailing-edge sandwich member located at the ventral side;
the reinforcing member is provided with a lightweight core material which is made of plastic foam or wood, a dorsal-side skin member disposed at the dorsal side of the lightweight core material, and a ventral-side skin member disposed at the ventral side of the lightweight core material;
the lightweight core material is integrally formed with the dorsal-side skin member and the ventral-side skin member so as to be sandwiched therebetween;
the dorsal-side skin member and/or the ventral-side skin member is formed of fiber-reinforced plastic in which reinforcement fibers are oriented in a blade longitudinal direction;
a second skin member, that is disposed on an outer side of the lightweight core material, the dorsal-side skin member, and the ventral-side skin member, is further provided; and
the lightweight core material, the dorsal-side skin member, the ventral-side skin member, and the second skin member are integrally formed.

2. A wind-turbine rotor blade according to claim 1, wherein the second skin member continues uninterruptedly about the outer side of the lightweight core material, the dorsal-side skin member, and the ventral-side skin member.

3. A wind-turbine rotor blade according to claim 1, wherein the dorsal-side skin member, and the ventral-side skin member are respectively secured to opposed inner surfaces of portions of the outer skin member, by adhesive.

4. A wind turbine for wind power generation comprising a wind-turbine rotor blade according to claim 1.

5. A wind-turbine rotor blade comprising: an outer skin member formed of fiber-reinforced plastic, shear webs, and trailing-edge sandwich members disposed closer to a trailing edge than the shear webs,
wherein the outer skin member at a dorsal side located closer to the trailing edge than a trailing-edge end of the trailing-edge sandwich member located at the dorsal side or a vicinity of the trailing-edge end of the trailing-edge sandwich member located at the dorsal side is coupled, via a reinforcing member, with the outer skin member at a ventral side located closer to the trailing edge than a trailing-edge end of the trailing-edge sandwich member located at the ventral side or a vicinity of the trailing-edge end of the trailing-edge sandwich member located at the ventral side;
the reinforcing member is provided with a trapezoidal-shaped strut member which is made of plastic foam or wood, a dorsal-side skin member disposed at the dorsal side of the trapezoidal-shaped strut member, and a ventral-side skin member disposed at the ventral side of the trapezoidal-shaped strut member;
the trapezoidal-shaped strut member is integrally formed with the dorsal-side skin member and the ventral-side skin member so as to be sandwiched therebetween;
the dorsal-side skin member and/or the ventral-side skin member is formed of fiber-reinforced plastic in which reinforcement fibers are oriented in a blade longitudinal direction;
a second skin member, that has a substantially angular-U-shape in cross section and that is disposed so as to contact an outer side of the trapezoidal-shaped strut member, the dorsal-side skin member, and the ventral-side skin member, is further provided; and
the trapezoidal-shaped strut member, the dorsal-side skin member, the ventral-side skin member, and the second skin member are integrally formed.

6. A wind-turbine rotor blade according to claim 5, wherein the second skin member continues uninterruptedly about the outer side of the trapezoidal-shaped strut member, the dorsal-side skin member, and the ventral-side skin member.

7. A wind-turbine rotor blade according to claim 5, wherein the dorsal-side skin member, and the ventral-side skin member are respectively secured to opposed inner surfaces of portions of the outer skin member, by adhesive.

8. A wind turbine for wind power generation comprising a wind-turbine rotor blade according to claim 5.

* * * * *